(12) United States Patent
Xiong et al.

(10) Patent No.: US 10,685,672 B2
(45) Date of Patent: Jun. 16, 2020

(54) LINEARITY DETECTING METHOD AND DEVICE FOR SERVO POSITION SENSOR, AND ROBOT WITH THE SAME

(71) Applicant: UBTECH Robotics Corp, Shenzhen (CN)

(72) Inventors: Youjun Xiong, Shenzhen (CN); Lifu Zhang, Shenzhen (CN); Wenhua Fan, Shenzhen (CN); Malin Wang, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 76 days.

(21) Appl. No.: 16/163,589

(22) Filed: Oct. 18, 2018

(65) Prior Publication Data
US 2019/0198048 A1 Jun. 27, 2019

(30) Foreign Application Priority Data
Dec. 22, 2017 (CN) .......................... 2017 1 1402658

(51) Int. Cl.
*G11B 5/584* (2006.01)
*G11B 5/55* (2006.01)
(52) U.S. Cl.
CPC ............ *G11B 5/584* (2013.01); *G11B 5/5552* (2013.01)

(58) Field of Classification Search
CPC .............................. G11B 5/584; G11B 5/5552
See application file for complete search history.

(56) References Cited

U.S. PATENT DOCUMENTS

| 5,189,612 A | * | 2/1993 | Lemercier | ............ | G05D 1/0261 701/23 |
| 2011/0235861 A1 | * | 9/2011 | Nitanda | ............ | G06K 9/00798 382/103 |

* cited by examiner

*Primary Examiner* — Cortez M Cook

(57) ABSTRACT

The present disclosure provides a linearity detecting method and apparatus for a servo position sensor, and a robot with the same. The method includes: collecting and saving an output angle of the servo under test; analyzing the output angle to obtain a relationship curve of angle and time of the servo under test to rotate for one turn; extracting angle information of a starting point to an ending point of the output angle corresponding to the position sensor in the servo under test based on the relationship curve of angle and time to obtain valid angle data; and determining whether the output angle corresponding to the position sensor is linear based on the valid angle data. The present disclosure can solve the problem that an external sensor and a fixture are required when detecting the linearity of the sensor which causes complicated operation, high detection cost, and low detection efficiency.

14 Claims, 12 Drawing Sheets

LINEARITY DETECTING METHOD AND DEVICE FOR SERVO POSITION SENSOR, AND ROBOT WITH THE SAME

CROSS REFERENCE TO RELATED APPLICATIONS

This application claims priority to Chinese Patent Application No. 201711402658.5, filed Dec. 22, 2017, which is hereby incorporated by reference herein as if set forth in its entirety.

BACKGROUND

1. Technical Field

The present disclosure relates to servo performance detection technology, and particularly to a linearity detecting method and device for a servo position sensor, and robot wish the same.

2. Description of Related Art

A servo is a position servo drive, which is a typical closed-bop feedback servo system, and is suitable for the systems that require the angle to keep changing and remain driven. The servo can realize position self-locking and position tracking, which has a compact size, good stability, simple control and is easy to interface with a digital system, hence it is widely used in model airplanes and various motor products.

The servo is an important power component of a control system. The performance of a position sensor of the servo is an important metric for determining whether the servo is qualified, which directly affects the bask functions of the servo. The linearity of the position sensor of the servo is an important metric to determine the performance of the sensor itself. That is, the abnormality of the performance of the position sensor of the servo will be reflected in its linearity. For example, the fault in the sensor of the servo may cause that the servo can't be locked at a specific position. Therefore, the linearity detection for the position sensor is a very important test item in the production of servos. In the prior art, the detection for the linearity of the position sensor of the servo often requires an external sensor and a fixture. It is necessary to use the external sensor with better linearity and the special fixture for performing the detection, which is complicated in operation, high in detection cost, and the detection efficiency is low.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it wilt be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

Figure 1:
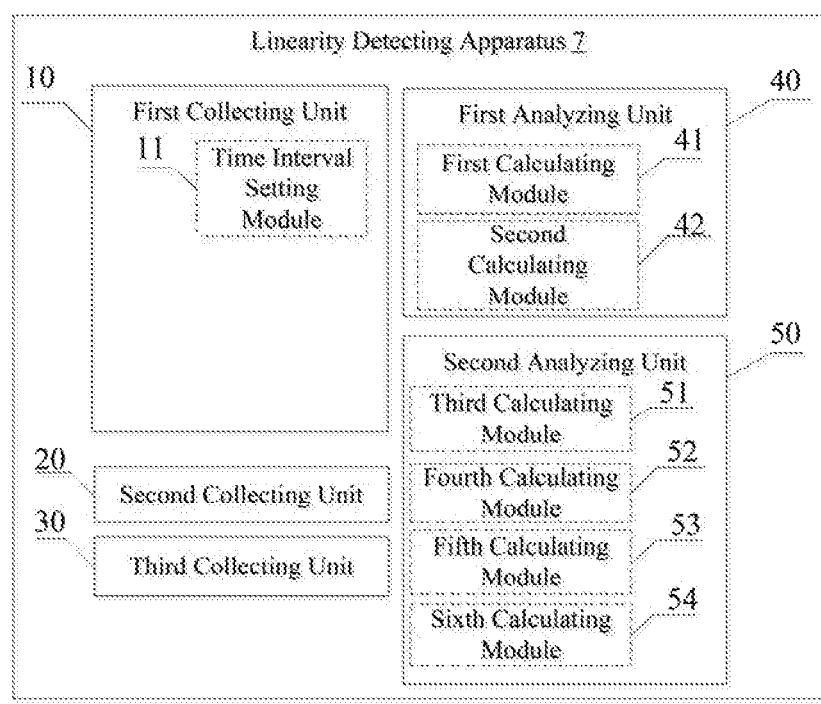
FIG. 1 is a schematic block diagram of an embodiment of a linearity detecting apparatus for a position sensor of a servo according to the present disclosure.

FIG. 1 is a schematic block diagram of an embodiment of a linearity detecting apparatus 7 for a position sensor of a servo according to the present disclosure. For the convenience of description, only parts related to this embodiment are shown. A linearity detecting apparatus 7 is installed in a robot with a servo, in which the servo is provided with a position sensor such as a potentiometer sensor and a magnetic encoder sensor for collecting output angles of the servo. The servo is driven by a motor, and may be used as a joint of the robot so as to realize the movement of a limb of the robot which connected to the joint. The movement of the servo specifically means the rotation of an output shaft of the servo which is driven by the motor. As shown in FIG. 1, the linearity detecting apparatus 7 includes:

a first collecting unit 10 configured to collect and saving an output angle of the servo under test;

a second collecting unit 20 configured to obtain a relationship curve of angle and time of the servo under test to rotate for one turn;

a third collecting unit 30 configured to extract angle information of a starting point to an ending point of the output angle corresponding to the position sensor in the servo trader test based on the relationship curve of angle and time to obtain valid angle data;

a first analyzing unit 40 configured to analyze the output angle; and a second analyzing unit 50 configured to determine whether the output angle corresponding to the position sensor is linear based OR the valid angle data.

Each of the above-mentioned units may be implemented in the form of hardware (e.g., a circuit), software (e.g., a program), or a combination thereof (e.g., a circuit with a single chip microcomputer). In one embodiment, the apparatus 7 includes one or more processors, a storage, and one or more computer programs stored in the storage and executed by the processor, where the one or more computer programs include the above-mentioned units. The first collecting unit 10 includes:

a time interval setting module 11 configured to set a time interval, and to collect and save the output angle of the servo under test at a regular interval.

The first analyzing unit 40 includes:

a first calculating module 41 configured to obtain a starting data point A(0) of the servo under test to rotate for one turn; and a second calculating module 42 configured to obtain a ending data point A(n) of the servo under test to rotate for one turn.

The second analyzing unit 50 includes:

a third calculating module 51 configured to calculate the first valid angle data point A(i) meeting a first formula: $A(i-2) < A(i-1) < A(i) < A(i+1) < A(i+2)$, where $i \in [2, n-2]$, and i is the first point meeting the first formula;

a fourth calculating module 52 configured to calculate the last valid angle data point A(j) meeting a second formula: $A(j-2) < A(j-1) < A(j) < A(j+1) < A(j+2)$, where $j \in [n-2, 2]$, and j is the first point meeting the second formula;

a fifth calculating module 53 configured to calculate two data points A(i+s) and A(j−s) based on the formula; $s = p*(j-i)/100$, where p is a constant within the range of [0, 15]; and a sixth calculating module 54 configured to generate an ideal straight line Y(x) based on the data points A(i+s) and A(j−s) and calculate a maximum deviation value Emax between the actual angle curve A(x) and the ideal straight line Y(x) as well, as the maximum deviation rate E.

In summary, in this embodiment, the linearity detecting apparatus 7 for a position sensor of a servo receives the instruction, set the time interval, and collects the angle data of the servo under test. After the first analysis, the data of correspondence relationship of angle and time for the servo under test to rotate for one turn is obtained, the valid part of the data of the position sensor of the servo under test m obtained by calculation, and the linearity of the position sensor of the servo under test is determined based on the analysis result of the change curve of angle and time of the valid part of the data. The detection process can be automated without adding an external sensor with better linearity and a special fixture, and merely needs to transmit a specific combination instruction to the servo under test. The intelligent homing algorithm is used to determine the data of the servos with the potentiometer sensor and the magnetic encoder sensor. Through the data analysis method proposed in the embodiment, the performance of the servo position sensor can be quickly detected, and the servo with the sensor of poor linearity can be found, thereby ensuring the consistency of the performance of the produced servo. The detection method is simple and efficient, has low implementation cost, and guarantees the consistency in the production performance of servos.

It should be noted that, those skilled in the art may clearly understand that, for the convenience and simplicity of description, the division of the above-mentioned functional modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional module is merely for the convenience of distinguishing each other and are not intended to limit the scope of protection of the present disclosure. For the specific operation process of the modules in the above-mentioned device, reference may be made to the corresponding processes in the above-mentioned method embodiments, and are not described herein.

Figure 2:
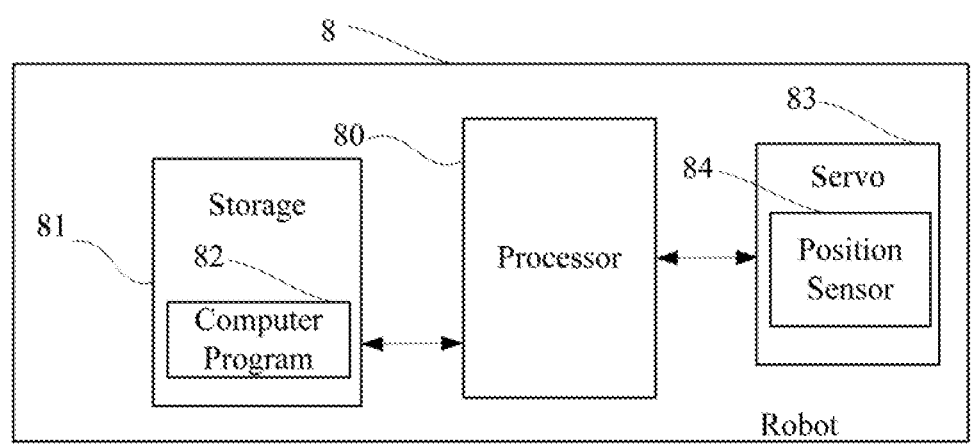
FIG. 2 is a schematic block diagram of an embodiment of a robot according to the present disclosure.

FIG. 2 is a schematic block diagram of an embodiment of a robot according to the present disclosure. As shown in FIG. 2, the robot 8 of this embodiment includes a processor 80, a storage 81, a computer program 82, at least a servo 83, and a position sensor 84. The computer program 82 is stored in the storage 81 (e.g., a memory) and executable on the processor 80, for example, a program for analyzing and calculating collected data. When executing (instructions in) the computer program 82, the processor 80 implements the steps in the above-mentioned embodiments of the linearity detecting method for a position sensor of a servo, for example, steps S101-S104 shown in FIG. 3, where the position sensor 84 is for collecting output angles of the servo. Alternatively, when the processor 80 executes the (instructions in) computer program 82, the functions of each module/unit in the above-mentioned device embodiments, for example, the functions of the modules 10-50 shown in FIG. 1 are implemented. The servo 83 is driven by a motor, and may be used as a joint of the robot so as to realize the movement of a limb of the robot which connected to the joint, where the movement of the servo 83 specifically means the rotation of an output shaft of the servo 83 which is driven by the motor.

Exemplarily, the computer program 82 may be divided into one or more modules/units, and the one or more modules/units, are stored in the storage 81 and executed by the processor 80 to realize the present disclosure. The one or more modules/units may be a series of computer program instruction sections capable of performing a specific function, and the instruction sections are for describing the execution process of the computer program 82 in the robot 8. For example, computer program 82 can be divided into a synchronization module, a summary module, an obtaining module, and a return module (a module in the virtual device), and the specific functions of each module are as follows:

the synchronization module is configured to synchronize the angle generated by the servo under test 83 driven by the constant PWM signal;

the summary module is configured to determine and summarize the collected angle of the servo under test 83 to obtain an corresponding angle of rotating for one cycle;

the obtaining module is configured to further extract the corresponding angle of the obtained cycle to obtain the valid part of the data of the position sensor of the servo under test 83; and the return module is configured to return the obtained valid part of the data to a calculation unit, and calculate and analyze the returned data through a program.

In one embodiment, the robot 8 may include a linearity detecting apparatus (see FIG. 1) including the processor 80 and the storage 81. It can be understood by those skilled in the art that FIG. 2 is merely an example of the robot 8 and does not constitute a limitation on the robot 8, and may include more or fewer components than those shown in the figure, or a combination of some components or different components. For example, the robot 8 may further include an input/output device, a network access device, a bus, and the like.

The processor 80 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 81 may be an internal storage unit of the robot 8, for example, a hard disk or a memory of the robot 8. The storage 81 may also be an external storage device of the robot 8, for example, a plug-in hard disk, a smart media card (SMC), a secure digital (SD) card, flash card, and the like, which is equipped on the robot 8. Furthermore, the storage 81 may further include both an internal storage unit and an external storage device, of the robot 8. The storage 81 is configured to store the computer program and other programs and data required by the robot 8. The storage 81 may also be used to temporarily store data that has been or will be output.

Figure 3:
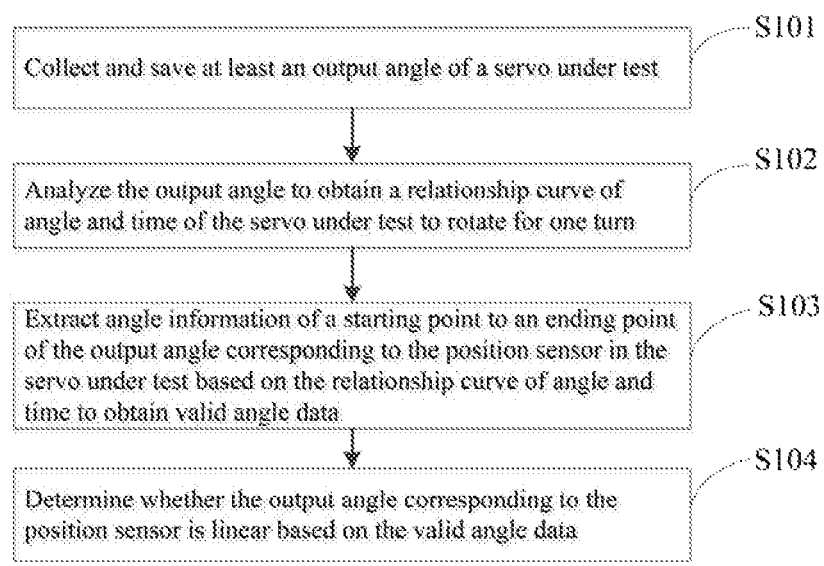
FIG. 3 is a flow chart of an embodiment of a linearity detecting method for a position sensor of a servo according to the present disclosure.

FIG. 3 is a flow chart of an embodiment of a linearity detecting method for a position sensor of a servo according to the present disclosure. The method can be applied to the detection of a servo of a robot, in which the servo is provided with a position sensor such as a potentiometer sensor and a magnetic encoder sensor for collecting output angles of the servo, which is capable of quickly determining whether the linearity, of the sensor of the servo is qualified without an external sensor. In this embodiment, the method is a computer-implemented method executable for a processor, which may be implemented through a linearity detecting apparatus for a position sensor of a servo shown in FIG. 1. The servo is driven by a motor, and may be used as a joint of the robot so as to realize the movement of a limb of the robot which connected to the joint, where the movement of the servo specifically means the rotation of an output shaft of the servo which is driven by the motor. As shown in FIG. 3, the method includes the following steps.

S101: collecting and saving at least an output angle of the servo under test.

In this embodiment, the servo under test includes a 180 degree servo, a 360 degree servo, and a servo of other angles. The 180 degree servo is rotated between 0 degree and 180 degrees, and the 360 degree servo can be rotated continuously. The servo can be kept in a certain position once receiving one constant pulse width modulation (PWM) signal. In the case that the load is constant, angle data is collected and saved during the constant speed rotation of the servo while the motor of the servo is driven to rotate by the constant PWM signal.

It should be noted that the collected angle of the servo under test may be an angle generated when the servo is rotated forwardly or reversely, which is the angle generated by the servo to rotate for at least one cycle.

The step S101 further includes: setting a time interval; and collecting and saving the output angle of the servo under test at a regular interval.

In this embodiment, an instruction that is a time based pulse signal of a certain time is received by the motor when the servo under test is rotated, which controls the motor of the servo under test to be driven by a constant PWM signal. For example, a control signal of the servo is a constant PWM signal with the period of 20 ms, the motor is controlled to rotate once receiving the control signal so that the motor drives a series of gear sets, and the gear sets drive an output servo wheel after deceleration so as to keep the servo in a certain position and a certain angle.

When the servo under test is driven by a fixed PWM signal to rotate, the time interval is set to collect the angle data of the servo. For example, a time based pulse signal of about 20 ms is transmitted to the servo. The high level part of the pulse signal is generally an angle control pulse part in the range of 0.5 ms to 2.5 ms. For a 180 degree servo, the reference value of the corresponding control relationship may be: 0.5 ms corresponds to the 0 degree of the servo under test, 1.0 ms corresponds to the 45 degrees of the servo under test, 1.5 ms corresponds to the 90 degrees of the servo under test, 2.0 ms corresponds to 135 degrees of the servo under test, and 2.5 ms corresponds to 180 degrees of the servo under test. The collected angle can be obtained by collecting the angle data of the servo according to the above-mentioned time interval.

In addition, for a 360 degree servo, the time interval can be selected between 0 and 5 ms.

In summary, in this embodiment, the specific method for collecting the angle data of the servo under test includes: setting the time interval, collecting the corresponding angle data which is generated by the servo under test driven by the constant PWM signal. Which provides a basis for the subsequent analysis of the curve of the change of angle and time, so that the method can be simple and efficient, and makes the detection operation convenient.

S102: analyzing the output angle to obtain a relationship curve of angle and time of the servo under test to rotate for one turn.

In this embodiment, the data generated by forward or reverse rotating the servo for at least one turn is analyzed. For example, for a 180 degree servo, angle-time correspondence data generated after rotating forwardly or reversely for 180 degrees is obtained; for a 360 degree servo, angle-time correspondence data generated after rotating forwardly or reversely for one turn is obtained.

Figure 7A:
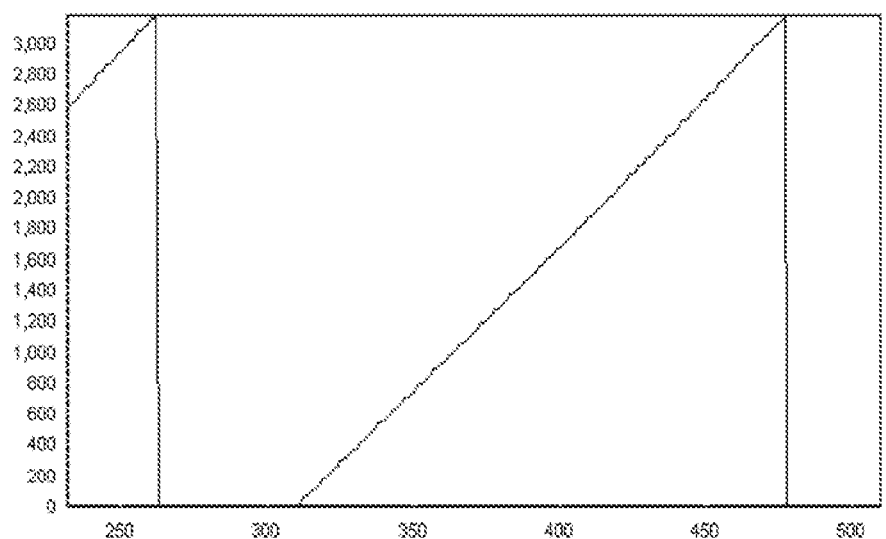
FIG. 7A is a schematic block diagram of a corresponding curve of the angle and the time of a servo with a potentiometer sensor to make one forward turn according to an embodiment of the present disclosure.
Figure 7B:
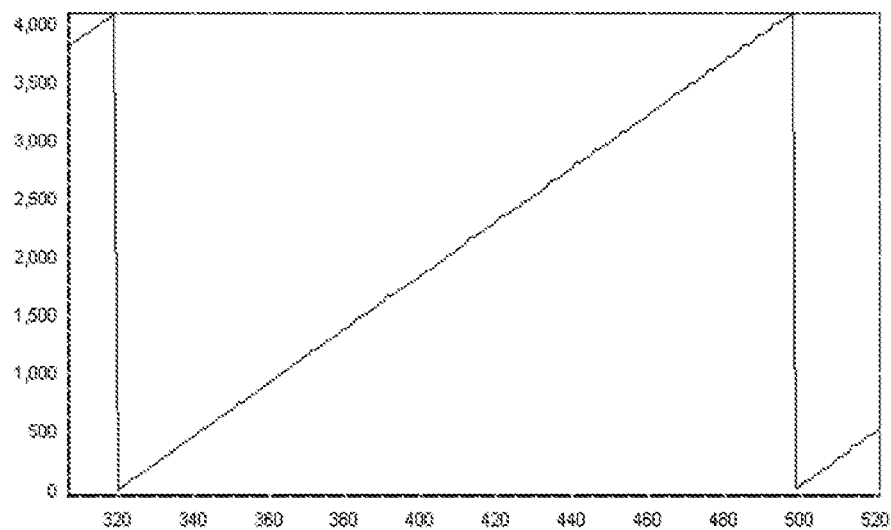
FIG. 7B is a schematic block diagram of a corresponding curve of the angle and the time of a servo with a magnetic encoder sensor to make one forward turn according to an embodiment of the present disclosure.
Figure 7C:
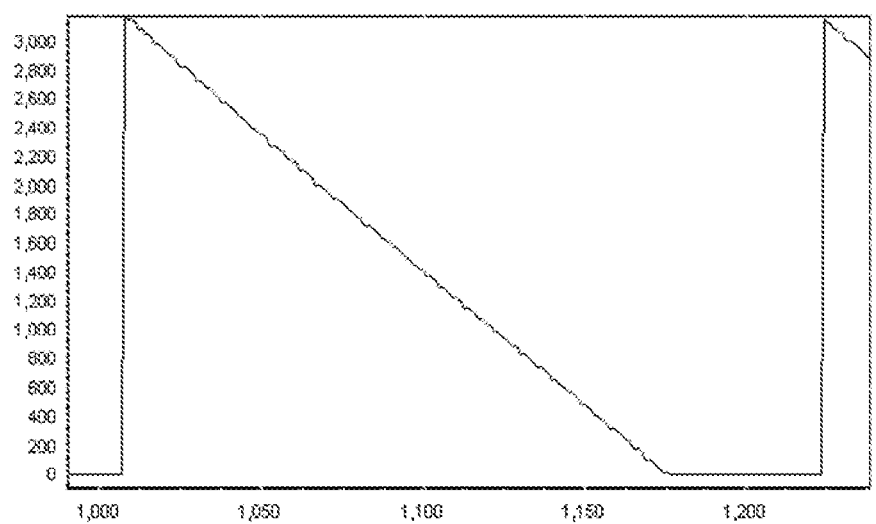
FIG. 7C is a schematic block diagram of a corresponding curve of the angle and the time of a servo with a potentiometer sensor to make one reverse turn according to an embodiment of the present disclosure.
Figure 7D:
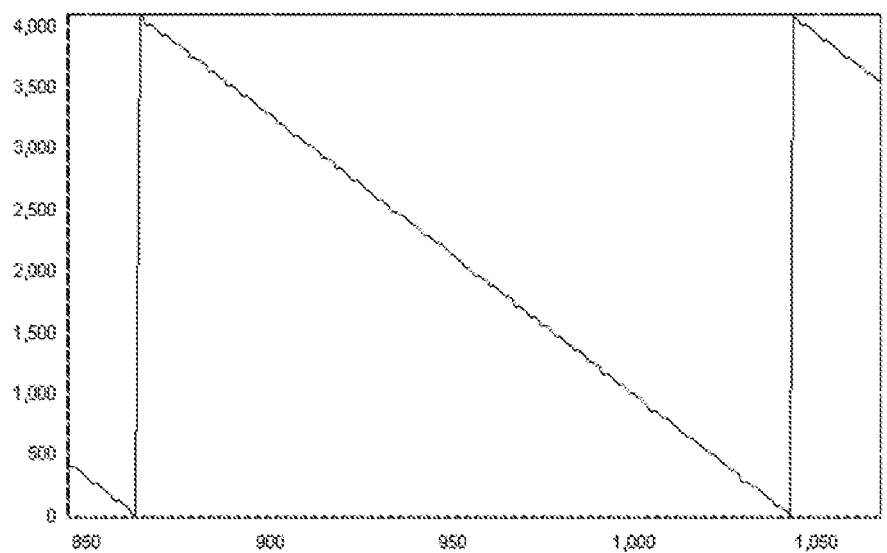
FIG. 7D is a schematic block diagram of a corresponding curve of the angle and the time of a servo with a magnetic encoder sensor to make one reverse turn according to an embodiment of the present disclosure.

In which, when the servo is rotated forwardly or reversely, there will be a large jump in the angle of the sensor after one cycle of rotation, for example, the corresponding curves of the angle and the time of the servo with the potentiometer sensor to make one forward turn and one reverse turn are respectively shown in FIG. 7A and FIG. 7C, and the corresponding curves of the angle and the time of the servo with the magnetic encoder to make one forward turn and one reverse turn are respectively shown in FIG. 7B and FIG. 7D, where the unit of the X axis is 2 ms, and the unit of the Y axis is 0.08 degrees. The data of above-mentioned output angle is analyzed according to this feature (i.e., the large jump after one cycle of rotation), and the data of the correspondence relationship of angle and time of the servo under test to rotate for one turn is obtained.

S103: extracting angle information of a starting point to an ending point of the output angle corresponding to the position sensor in the servo under test based on the relationship curve of angle and time to obtain valid angle data.

In this embodiment, when the servo under test is rotated in the forward direction or the reverse direction, as the servo with the potentiometer sensor shown in FIG. 7A and FIG. 7C which make one forward turn and one reverse turn, there will be an angular dead zone in the curve of the change of the correspondence relationship of angle and time. Therefore, it is necessary to extract a valid part of the obtained angle data.

In addition, different types of position sensors have different valid ranges, especially for potentiometer position sensors, which has the structure of different types that have various valid angle ranges, and the valid part of the obtained data of the position sensor of different servos under test is also different.

The linearity of the servo position sensor is an important metric lot determining the performance of the sensor itself. In this embodiment, the motor of the servo is driven by the constant PWM signal, and according to the relationship between the voltage and the rotational speed of the motor, it can be considered that the rotation speed pf the motor driven by the constant PWM signal is constant while the load is constant, that is, in the case of constant load, if the motor is driven to rotate by the constant PWM signal, the change rate of the curve of the angle and time of the servo should also be constant, hence it analyzes the change curve of angle and time in the valid part of the collected data.

Furthermore, the analysis of the valid part of the data includes analyzing the data of the change curve of angle and time when the servo is rotated forwardly and reversely, respectively.

S104: determining whether the output angle corresponding to the position sensor is linear based on the valid angle data.

In this embodiment, the linearity of the servo position sensor is an important metric for determining whether the servo is qualified. At the same time, the abnormality of the performance of the servo position sensor can also be expressed as its linearity. Hence, after determining the linearity of the position sensor based on the analysis result of the change curve of angle and time, it can determine that, whether the produced servo is qualified.

In which, the obtained result includes live results obtained by respectively analyzing the curve of angle and time of different rotation directions of the servo driven by the constant PWM signal.

In summary, in this embodiment, the linearity detecting method for a position sensor of a servo collects the valid part of the angle data of the position sensor of the servo driven to rotate by the constant PWM signal and analyzes the change curve of angle and time, which can realize the detection of the performance of the position sensor of the servo. As a result, the operation is simple, the detection cost is greatly reduced, the detection efficiency is improved, and the consistency of the production performance of the servo is guaranteed.

Figure 4:
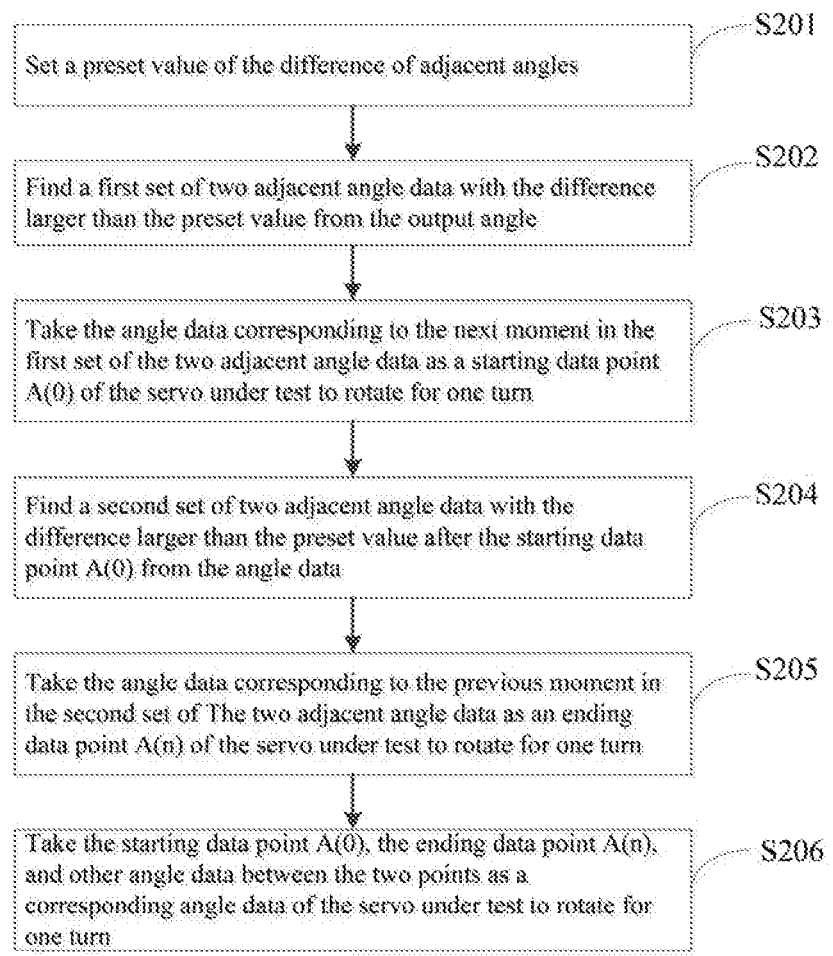
FIG. 4 is a flow chart of a method for obtaining a relationship curve of angle and time of a servo under test to rotate for one turn according to an embodiment of the present disclosure.

FIG. 4 is a flow chart of a method for obtaining a relationship curve of angle and time of a servo under test to rotate tor one turn according to an embodiment of the present disclosure. In comparison with the previous embodiment, in order to describe in more detail, this embodiment mainly analyzes the output angle to obtain an angle-time, correspondence curve relationship of the servo to be rotated for one turn. As shown in FIG. 4, the method includes the following steps.

S201: setting a preset value of the difference of adjacent angles.

In this embodiment, the motor of the servo under test is driven to rotate by the constant PWM signal. According to the relationship between the voltage and the rotation speed of the motor, in the case that the load of the motor is constant, the rotation speed of the motor driven to rotate by the constant PWM signal can be considered to be constant. That is, in the case of constant load, if the motor is driven to rotate by the constant PWM signal, the change of the angle of the servo corresponding to the preset fixed time interval should also be constant. For example, for the reference values of the time with respect to the angle which are set in the previous embodiment, the change of the angle should be constant. However, in an actual operation, the angle may have a large jump after the servo is rotated for one cycle. Therefore, the preset value of the difference between adjacent angles is set as a reference standard for the adjacent angle difference of the servo to rotate in one cycle.

S202: finding a first set of two adjacent angle data with the difference larger than the preset value from the output angle.

In this embodiment, the output angle is the angle data of the servo under test driven to rotate by the constant PWM signal, which is collected by setting at a time interval for the collection, while the collected angle is the angle data generated by the servo under test driven to rotate for more than one turn. The difference of the collected adjacent angles is compared with the preset value of the angle difference in the order of time. Due to the characteristics of the position sensor of the servo under test, the angle does not change at the beginning, hence the angle data is invalid although the difference of the adjacent angle is within the preset value. Therefore, it is necessary to find the first set of the two adjacent angles with the difference larger than the preset value, which indicates that the angular data may have a jump with the change of time, and also indicates that the servo under test begins to generate the angle data that changes with the change of time in a new cycle.

S203: taking the angle data corresponding to the next moment in the first set of the two adjacent angle data as a starting data point A(0) of the servo under test to rotate for one turn.

In this embodiment, if the first set of the angle data having the difference of adjacent angles lager than the preset value is found, it indicates that the angle data of the servo under test may jump with the change of time, that is, in the first set of data, the data corresponding to the previous moment and the corresponding data before the previous moment belong to the angle data at the end of the previous rotation cycle, or be the invalid valise region before the end of the previous rotation cycle of the servo under test, or the invalid value region from the beginning of the detected rotation cycle until the data jump. For example, for a 180 degree servo, the angle of the previous moment in the two adjacent angle data in the first set is 180 degrees, and the angle of the next moment is 0 degree, the difference between the two is obviously large, and the angle of the previous moment is the corresponding angle data at the end of the previous rotation period, while the angle of the next moment is the corresponding angle data at the beginning of the next rotation period. Therefore, the angle data corresponding to the next moment in the first set of the adjacent angle data is selected as the starting, data point A(0) of a new rotation cycle of the servo under test.

S204: finding a second set of two adjacent angle data with the difference larger than the preset value after the starting data point A(0) from the angle data.

In this embodiment, in the case that the load is constant, if the motor of the servo under test is driven to rotate by the constant PWM signal, the change of the angle of the servo under test with the change of time should also: be constant, that is, the difference of adjacent angles is constant. Similar to the principle of step S202, in a practical data collection, the difference of the adjacent angle data of a part of the data after the starting data point A(0) is within the range of the preset value. If the second set of the two adjacent angles which is larger than the preset value is found after the start data point A(0), which indicates that the angle data may have a jump with the change of time, and also indicates that the servo under test begins to generate the angle data winch changes with the change of time in the next cycle.

S205: taking the angle data corresponding to the previous moment in the second set of the two adjacent angle data as an ending data point A(n) of the servo under test to rotate for one turn.

In this embodiment if the second set of the angle data having the difference of adjacent angles lager than the preset value is found, it indicates that the angle data of the servo under test may jump with the change of time, that is, in the second set of data, the data corresponding to the next moment and the data corresponding to a moment after the next moment belong to the angle data at the beginning of the next rotation cycle, or the invalid value region after the beginning of the next rotation cycle of the servo under test, or a part of the invalid value region before the end of the rotation cycle of the servo under test. For example, for a 360 degree servo, the angle oi the previous moment in the second set of the two adjacent angles is 360 degrees, and the angle of the next moment is 0 degree, the difference between the two is obviously large, and the angle of the previous moment is the corresponding angle at the end of the detected rotation period while the angle of the next moment corresponds to the corresponding angle data at the beginning of the next rotation period. Therefore, the angle data corresponding to the previous moment in the second set of the adjacent angle data is selected as the ending data point A(n) of a rotation cycle of the servo under test.

S206: taking the starling data point A(0), the ending data point A(n), and other angle data between the two points as a corresponding angle data of the servo under test to rotate for one turn.

In this embodiment, it can be determined by the first few steps that the starting data point A(0), the ending data point A(n), and other angle data between the two points is the corresponding angle data of the servo under test to rotate for one turn. The collection method of the corresponding angle data of the servo under test to rotate for one turn is suitable for a 180 degree servo, a 360 degree servo, or the servo of other angles.

It should be noted that, after finding out the starting data point A(0) of rotating throne turn, if the second set of data is to be searched, the first time to appear the second set of data with the difference exceeding the preset value should be after the starting data point A(0), so as to avoid the cross-cycle phenomenon due to the first set of data being far apart from the second set of data which results in the inaccurate in data collection.

In summary, the specific method for determining the corresponding angle data of the servo under test to rotate for one turn, the starting data point and the ending data point are determined by calculating the difference of adjacent angles, which guarantees the detection of the servo under test to rotate for one complete turn while ensures the validity of collected data, so as to provide a reliable basis for further data analysis.

Figure 5:
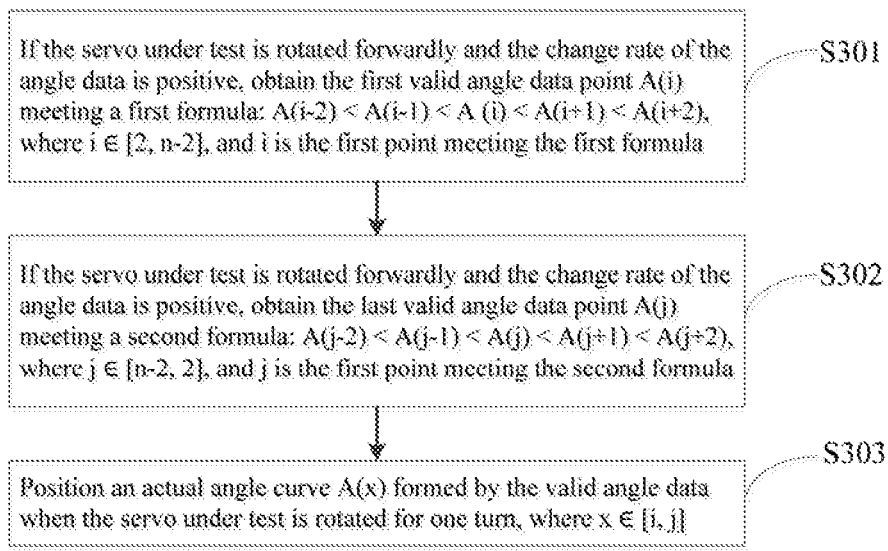
FIG. 5 is a flow-chart of a method for obtaining valid angle data according to an embodiment of the present disclosure.

FIG. 5 is a flow chart of a method for obtaining valid angle data according to an embodiment of the present disclosure. In order to further obtain the valid part of the data of the position sensor of the servo under test, in comparison with the previous embodiment, this embodiment provides another analyzing method of data comparison. As shown in FIG. 5, the method includes the following steps.

S301: if the servo under test is rotated forwardly and the change rate of the angle data is positive, obtaining the first valid angle data point A(i) meeting a first formula: $A(i-2)<A(i-1)<A(i)<A(i+1)<A(i+2)$, where $i \in [2, n-2]$, and i is the first point meeting the first formula.

In this embodiment, the detection of the linearity of the position sensor of the servo under test is an analysis of the relationship of angle and time of different rotation directions of the servo under test driven by the constant PWM signal, which includes data of different cases when the servo under test is rotated forwardly and reversely. In the found angle data of one cycle, a data point corresponding to the actual rotation direction of the servo under test is found respectively from the starting data points and the ending data points in the data of one cycle, in combination with the actual rotation direction of the servo under test.

If the servo under test is rotated forwardly, the angle is getting larger with the change of time, the corresponding change rate of the angle data is positive, and then the first valid angle data point A(i) of the sensor which meets a first formula: $A(i-2)<A(i-1)<A(i)<A(i+1)<A(i+2)$ is taken, where $i \in [2, n-2]$, and i is the first point meeting the first formula. After the servo under test is rotated for one turn, due to the characteristics of different position sensors of different servos, there will be an angular dead zone in the data corresponding to one cycle, that is, the sensor in the angular dead zone has no valid value, and it can determine that the data corresponding to the determined point begins to have changes in the angle through the inequality of the above-mentioned incremental relationship, if the angle is incremented, the corresponding A(i) is determined to be the first valid value.

In addition, based on the same principle, for the servo under test which is rotated reversely, the angle decreases with the change of time, the corresponding change rate of the angle data is negative, and then the first valid angle data point A(i) of the sensor which meets the formula: $A(i-2)>A(i-1)>A(i)>A(i+1)<A(i+2)$ is taken, where $i \in [2, n-2]$, and i is the first point meeting the formula. If the angle begins to decrease, the corresponding A(i) is determined to be the first valid value.

S302: if the servo under test is rotated forwardly and the change rate of the angle data is positive, obtaining the last valid angle data point A(j) meeting a second formula: $A(j-2)<A(j-1)<A(j)<A(j+1)<A(j+2)$, where $j \in [n-2, 2]$, and j is the first point meeting the second formula.

In this embodiment, if the servo under test is rotated forwardly, similarly to step S301, the last valid data point A(j) of the sensor meets the second formula: $A(j-2)<A(j-1)<A(j)<A(j+1)<A(j+2)$, where $j \in [n-2, 2]$, and j is the first point meeting the second formula. Since it is the last valid data of the sensor, which has the range of the value corresponding to the range of the first valid value, and still meets the incremental inequality.

In addition, if the servo under test is rotated reversely, the last valid data point A(j) of the sensor meets the formula: A(j−2)>A(j−1)>A(j)>A(j+1)>A(j+2), where j∈[n−2, 2], and j is the first point meeting the second formula. If it is rotated reversely, the decrement inequality will be met.

S303: positioning an actual angle curve A(x) formed by the valid angle data when the servo under test is rotated for one turn, where x∈[i, j].

In this embodiment, based on the first valid data A(i) and the last valid data A(j) determined in step S301 and step S302, the actual angle curve A(x) formed by the valid angle data point when the servo under test is rotated for one turn is successfully positioned through the data within the interval [i, j], where x∈[i, j].

It should be noted that, the valid angle data points determined by the method include valid the data points determined when the servo under test is driven by the constant PWM signal to rotate forwardly and reversely, where n is a point corresponding to the valid angle data between the first valid angle data A(i) and the last valid angle data A(j) which is equal to or larger than 4.

Figure 6:
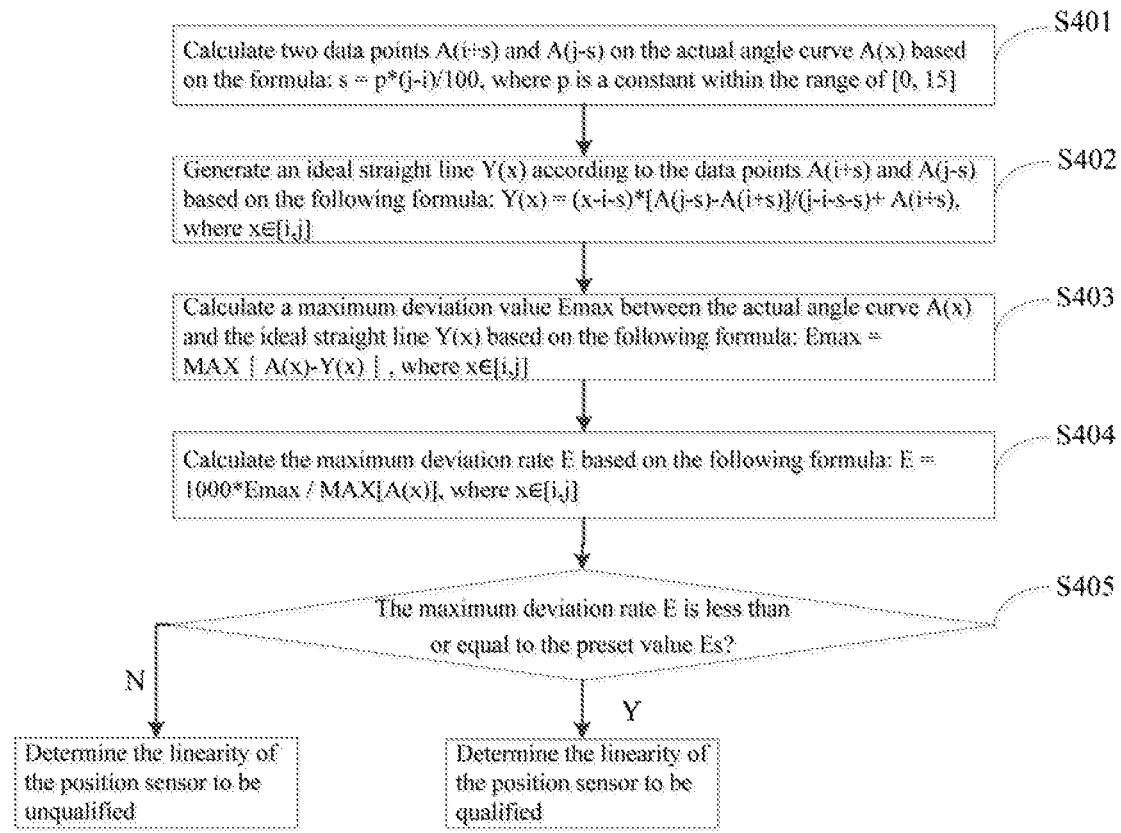
FIG. 6 is a flow chart of a method for determining whether the output angle corresponding to the position sensor is linear according to an embodiment of the present disclosure.

FIG. 6 is a flow chart of a method for determining whether the output angle corresponding to the position sensor is linear according to an embodiment of the present disclosure. As shown in FIG. 6, the method includes the following steps.

S401: calculating two data points A(i+s) and A(j−s) on the actual angle curve A(x) based on the formula: s=p*(j−i)/100, where p is a constant within the range of [0, 15].

In this embodiment, when analyzing the valid part of the servo under test, it is not directly using the first valid data point A(i) and the last valid data point A(j) to make an ideal straight line, but using the point A(i+s) and the point A(j−s) which A(i) and A(j) closing to s in the middle, because the linearity of the head and the tail of the general sensor is generally deviated. Therefore, the point closer to the middle is selected, and p is determined according to the actual system, in which different value is taken for different system, and the determined value tor generating the ideal straight line is also different.

S402: generating an ideal straight line Y(x) according to the data points A(i+s) and A(j−s) based on following formula: Y(x)=(x−i−s)*[A(j−2)−A(i+s)]/(j−i−s−s)+A(i+s), where x∈[i,j].

In this embodiment, an ideal straight line Y(x)=(x−i−s)*[A(j−s)−A(i+s)]/(j−i−s−s)+A(i+s) where x∈[i,j] can be generated according to the point A(i+s) and the point A(j−s). The above-mentioned straight line is a simple linear function curve. In the ideal straight line generated through two effective points, the actual data value may not completely cover all the points on the ideal straight line, and may be distributed in one side of the ideal straight line or in both sides of the ideal straight line.

It should be noted that, due to different systems, the selected constants p have different values, and the determined ideal straight lines will be different. Therefore, the actual angular data values and the distribution of the ideal straight line of different systems are also different.

S403: calculating a maximum deviation value Emax between the actual angle curve A(x) and the ideal straight title Y(x) based on the following formula: Emax=MAX|A(x)−Y(x)|, where x∈[i,j].

In this embodiment, the maximum deviation value Emax between the ideal straight line Y(x) and the actual angle curve A(x) can be calculated according to the obtained ideal straight line Y(x) and actual angle curve A(x). Since the distributions of the actual angle curve and the ideal straight line have multiple cases, the difference of the corresponding points of the two is also different, and the largest difference is selected as the maximum deviation value.

S404: calculating the maximum deviation rate E based on the following formula: E=1000*Emax/MAX[A(x)], where x∈[i,j].

In this embodiment, the maximum deviation rate corresponding to the maximum deviation value is calculated according to the formula E=1000*Emax/MAX[A(x)], where x∈[i, j].

It should be noted that, the calculation of the maximum deviation value and the calculation of the maximum deviation rate are all the analysis and calculations for the valid part of the angle data of the sensor in one cycle of the rotation of the servo under test, which includes the valid part of the angle data generated when the servo under test is driven to rotate forwardly and reversely by the constant PWM signal S405: determining the linearity of the position sensor based on the magnitude relationship between the maximum deviation rate E and a preset value Es:

determining the linearity of the position sensor to be unqualified, if E>Es.

determining the linearity of the position sensor to be qualified, if E≤Es.

In this embodiment, whether the linearity of the curve of the sensor of the servo is qualified is determined based on the magnitude relationship between the calculated maximum deviation rate E and the preset value Es, where the preset value Es is determined according to the actual servo, which is generally not more than 20.

Figure 8A:
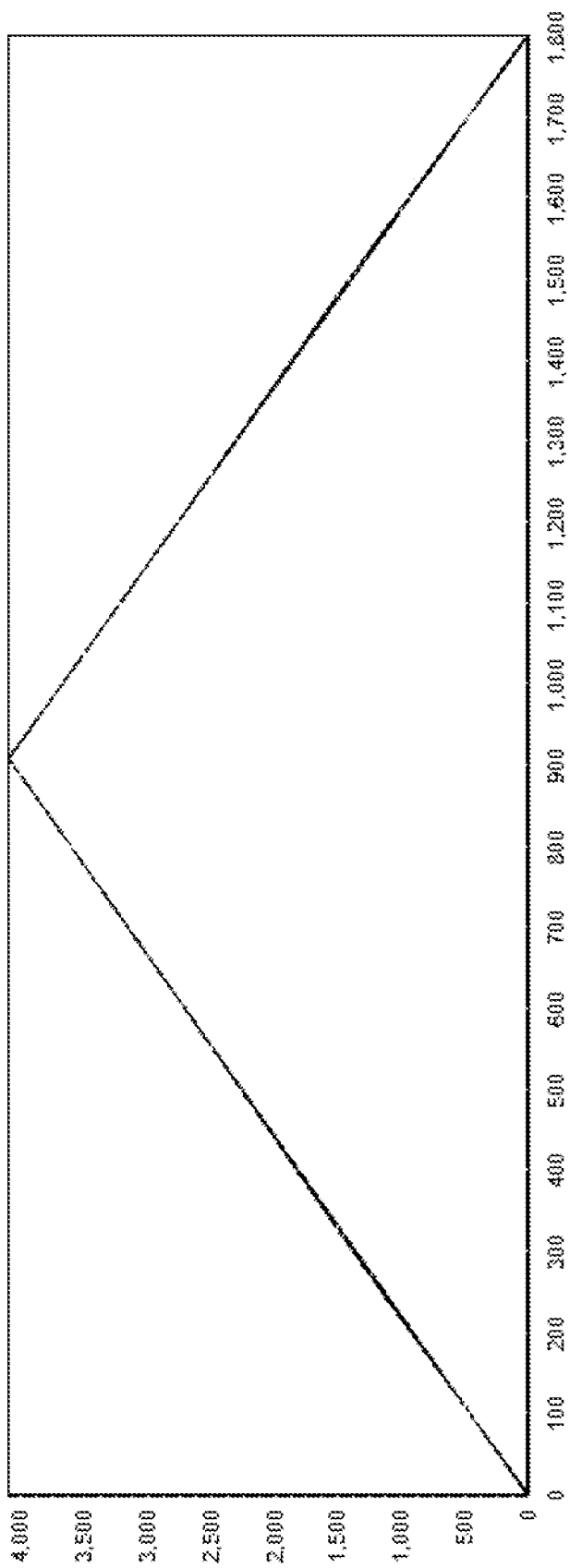
FIG. 8A is a schematic block diagram of an analysis result of a servo under test in an actual application according to an embodiment according to the present disclosure.
Figure 8B:
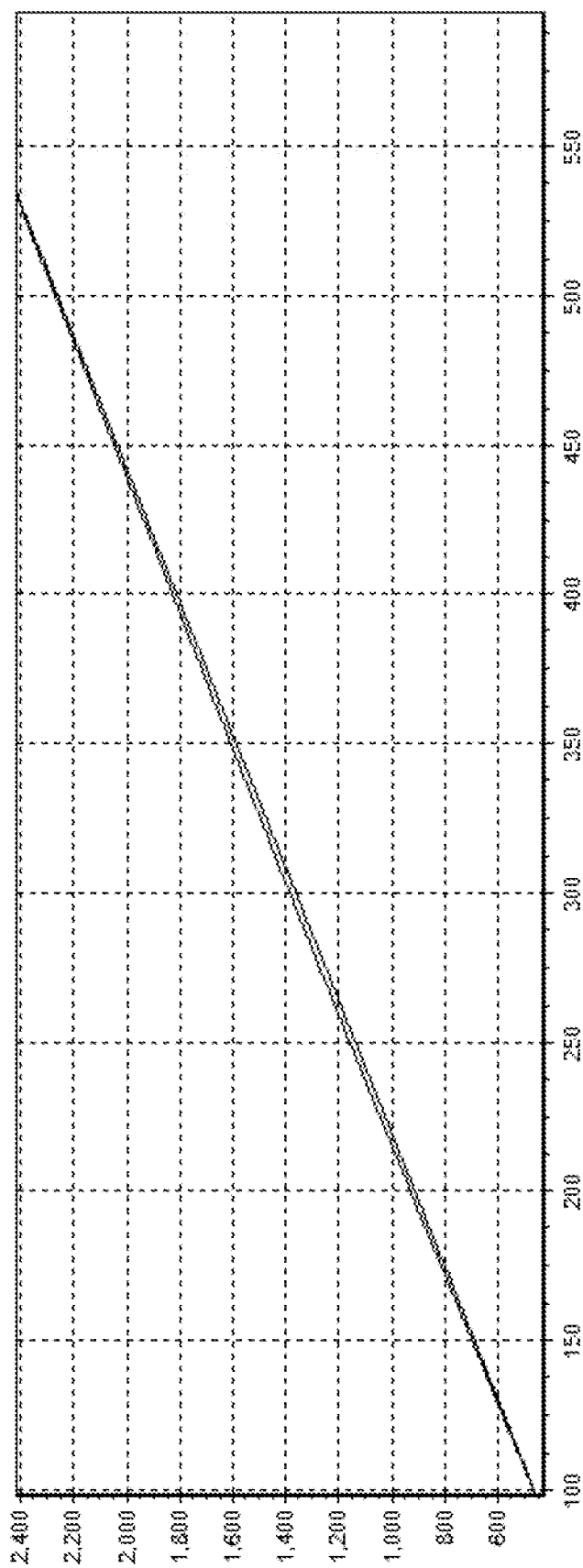
FIG. 8B is an enlarged schematic block diagram of an analysis result of a servo under test in an actual application according to an embodiment according to the present disclosure.

If the maximum deviation rate E is greater than the preset value Es, it is determined that the linearity of the curve of the sensor of the servo under test is unqualified, and then the servo is determined to be unqualified; if the maximum deviation rate E is less than or equal to the preset value Es, it is determined that the linearity of the curve of the sensor of the servo under test is qualified, and then the servo is determined to be qualified. FIG. 8A is a schematic block diagram of an analysis result of a servo under test in an actual application according to an embodiment according to the present disclosure, and FIG. 8B is an enlarged schematic block diagram of an analysis result of a servo under test in an actual application according to an embodiment according to the present disclosure, where the unit of the X axis is 2 ms, and the unit of the Y axis is 0.08 degrees. As shown in FIG. 8A, the change rate is positive when the servo is rotated forwardly; the change rate is negative when the servo is rotated reversely. As shown in FIG. 8B, the upper is the actual sensor angle curve, and the lower is the ideal straight line. It can be seen that the actual sensor angle curve of the servo under test does not completely coincide with the ideal straight line and a certain difference exists therebetween, and the linearity of the curve of the sensor of the servo under test is determined by calculating the difference, thereby determining whether the servo under test is qualified.

In this embodiment, when detecting the linearity of the position sensor of the servo, the linearity detecting method for a position sensor of a servo merely needs to transmit a specific combination instruction to the servo under test without adding an external sensor with better linearity and a special fixture. The whole detection process can be automated, and an intelligent homing algorithm is used to determine the data of the servos with the potentiometer sensor and the magnetic encoder sensor. Through the data analysis method proposed in the embodiment, the performance of the position sensor of the servo can be quickly detected, and the servo with the sensor of poor linearity can be found, thereby guaranteeing the consistency of the performance of the produced servo. As a result, the detection method is simple and efficient, the implementation cost low, and the consistency in the production performance of servos is guaranteed.

It should be understood that, the sequence of the serial number of the steps in the above-mentioned embodiments does not mean the execution order while the execution order of each process should be determined by its function and internal logic, which should not be taken as any limitation to the implementation process of the embodiments.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned, method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable flies, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The forgoing is only the specific embodiment of the present disclosure, while the scope of the present disclosure is not limited thereto. For those skilled in the art, various equivalent modifications or replacements that can be easily conceived within the technical scope of the present, disclosure should be included within the scope of the present disclosure. Therefore, the scope of the present disclosure should be determined in accordance with the scope of the claims.

What is claimed is:

1. A computer-implemented linearity detecting method for a position sensor of a servo of a robot, comprising executing on a processor the steps of:
   collecting at least an output angle of the servo under test, wherein the output angle is collected through the position sensor of the servo under test;
   analyzing the output angle to obtain a relationship curve of angle and time the servo under test to rotate for one turn;
   extracting angle information of a starting point to an ending point of the output angle corresponding to the position sensor in the servo under test based on the relationship curve of angle and time to obtain valid angle data; and determining whether the output angle corresponding to the position sensor is linear based on the valid angle data.

2. The method of claim 1, wherein the step of collecting the output angle of the servo under test comprises:
setting a time interval; and
collecting the output angle of the servo under test at a regular interval.

3. The method of claim 1, wherein the step of analyzing the output angle to obtain the relationship curve of angle and time of the servo under test to rotate for one turn comprises:
setting a preset value of the difference of adjacent angles;
finding a first set of two adjacent angle data with the difference larger than the preset value from the output angle;
taking the angle data corresponding to the next moment in the first set of the two adjacent angle data as a starting data point A(0) of the servo, under test to rotate for one turn;
finding a second set of two adjacent angle data with the difference larger than the preset value after the starting data point A(0) from the angle data;
taking the angle data corresponding to the previous moment in the second set of two adjacent angle data as a ending data point A(n) of the servo under test to rotate for one turn;
taking the starting data point A(0), the ending data point A(n), and other angle data between the two points as a corresponding angle data of the servo under test to rotate for one turn.

4. The method of claim 1, wherein the step of extracting the angle information of the starting point to the ending point of the output angle corresponding to the position sensor in the servo under test based on the relationship curve of angle and time to obtain the valid angle data comprises:
in response to the servo under test being rotated forward and the change rate of the angle data being positive, obtaining the first valid angle data point A(i) meeting a first formula;

$$A(i-2)<A(i-1)<A(i)<A(i+1)<A(i+2);$$

where, $i \in [2, n-2]$, and i is the first point meeting the first formula;
in response to the servo under test being rotated forward and the change rate of the angle data being positive, obtaining the last valid angle data point A(j) meeting a second formula:

$$A(j-2)<A(j-1)<A(j)<A(j+1)<A(j+2);$$

where, $j \in [n-2, 2]$, and j is the first point meeting the second formula;
positioning an actual angle curve A(x) formed by the valid angle data when the servo under test is rotated for one turn;
where, $x \in [i, j]$, and n is a point corresponding to the valid angle data between the first valid angle data A(i) and the last valid angle data A(j) and being equal to or larger than 4.

5. The method of claim 1, wherein the step of determining whether the output angle corresponding to the position sensor is linear based on the valid angle data comprises:
calculating two data points A(i+s) and A(j+s) on the actual angle curve A(x) based on, the formula: s=p*(j−i)/100;

where, p is a constant within the range of [0, 15];
generating an ideal straight line Y(x) according to the data points A(i+s) and A(j−s) based on the following, formula:

$$Y(x)=(x-i-s)*[A(j-s)-A(i+s)]/(j-i-s-s)+A(i+s), x \in [i,j];$$

calculating a maximum deviation value Emax between the actual angle curve A(x) and the ideal straight line Y(x) based on the following formula:

$$E\max = \mathrm{MAX}|A(x)-Y(x)|, x \in [i,j];$$

calculating the maximum deviation rate E based on the following formula:

$$E=1000*E\max/\mathrm{MAX}[A(x)], x \in [i,j];$$

determining the linearity of the position sensor based on the relationship between the maximum deviation rate E and a preset value Es:
determining the linearity of the position sensor to be unqualified, in response to E>Es;
determining the linearity of the position sensor to be qualified, in response to E≤Es.

6. The apparatus of claim 1, wherein the step of analyzing the output angle comprises:
obtaining a starting data point A(0) of the servo under test to rotate for one turn; and
obtaining an ending data point A(n) of the servo under test to rotate for one turn;
the step of determining whether the output angle corresponding to the position sensor is linear based on the valid angle data comprises:
calculating the first valid angle data point A(i) meeting a first formula:

$$A(j-2)<(i-1)<A(i)<A(i+1)<A(i+2);$$

where, $i \in [2, n-2]$, and A(i) is the first point meeting the first formula;
calculating the last valid angle data point A(j) meeting a second formula:

$$A(j-2)<A(j-1)<A(j)<A(j+1)<A(j+2);$$

where, $j \in [n-2, 2]$, A(j) is the first point meeting the second formula;
calculating two data points A(i+s) and A(j−s) based on the formula: s=p*(j−i)/100, wherein p is a constant within the range of [0, 15];
generating an ideal straight line Y(x) based on the data points A(i+s) and A(j−s) and calculate a maximum deviation value Emax between the actual angle curve A(x) and the ideal straight line Y(x) as well as the maximum deviation rate E.

7. The method of claim 1, wherein the position sensor comprises at least one of a potentiometer sensor and a magnetic encoder sensor, and the output angle is collected through at least one of the potentiometer sensor and the magnetic encoder sensor.

8. A linearity detecting apparatus for a position sensor of a servo of a robot, comprising a processor and a storage system, wherein the storage system stores computerized codes executable by the processor to perform a method, the method comprising:
collecting at least an output angle of the servo under test, wherein the output angle is collected through the position sensor of the servo under test;
analyzing the output angle;
obtaining a relationship curve of angle and time of the servo under test to rotate for one turn;

extracting angle information of a starting point to an ending point of the output angle corresponding to the position sensor in the servo under test based on the relationship curve of angle and time to obtain valid angle data; and determining whether the output angle corresponding to the position sensor is linear based on the valid angle data.

9. The apparatus of claim 8, wherein the step of collecting the output angle of the servo under test comprises:

setting a time interval; and collecting the output angle of the servo under test at a regular interval.

10. The apparatus of claim 8, wherein the position sensor comprises at least one of a potentiometer sensor and a magnetic encoder sensor.

11. A robot comprising:

at least a servo having a position sensor;

one or more processors;

a memory; and one or more computer programs stored in the memory and executed by the one or more processors, wherein the one or more computer programs comprise;

instructions for collecting an output angle of the servo under test, wherein the output angle is collected through the position sensor of the servo under test;

instructions for analyzing the output angle;

instructions for obtaining a relationship curve of angle and time of the servo under test to rotate for one turn;

instructions for extracting angle information of a starting point to an ending point of the output angle corresponding to the position sensor in the servo under test based on the relationship curve of angle and time to obtain valid angle data; and instructions for determining whether the output angle corresponding to the position sensor is linear based on the valid angle data.

12. The robot of claim 11, wherein the instructions for collecting an output angle of the servo under test comprises:

instructions for setting a time interval, and collecting the output angle of the servo under test at a regular interval.

13. The robot of claim 11, wherein the instructions for analyzing the output angle comprises:

instructions for obtaining a starting data point A(0) of the servo under test to rotate for one turn; and instructions for obtaining an ending data point A(n) of the serve under test to rotate for one turn;

the instructions for determining whether the output angle corresponding to the position sensor is linear based on the valid angle data comprises:

instructions for calculating the first valid angle data point A(i) meeting a first formula:

$$A(j-2)<A(j-1)<A(j)<A(j+1)<A(j+2);$$

where, i∈[2, n−2], and (i) is the first point meeting the first formula;

instructions for calculating the last valid angle data point A(j) meeting a second formula:

$$A(j-2)<A(j-1)<A(j)<A(j+1)<A(j+2);$$

where, j∈[n−2, 2], A(j) is the first point meeting the second formula;

instructions for calculating two data points A(i+s) and A(j−s) based on the formula: s=p*(j−i)/100, wherein p is a constant within the range of [0, 15]; and instructions for generating an ideal straight line Y(x) based on the data points A(i+s) and A(j−s) and calculate a maximum deviation value Emax between the actual angle curve A(x) and the ideal straight line Y(x) as well as the maximum deviation rate E.

14. The robot of claim 11, wherein the position sensor comprises at least one of a potentiometer sensor and a magnetic encoder sensor.

* * * * *